United States Patent
Potter et al.

(10) Patent No.: US 11,117,535 B2
(45) Date of Patent: Sep. 14, 2021

(54) SYSTEM AND METHOD FOR INTERACTIVE SCENE PROJECTION

(71) Applicant: Apple Inc., Cupertino, CA (US)

(72) Inventors: Daniel E. Potter, San Jose, CA (US); Bivin J. Varghese, San Jose, CA (US); Christopher P. Child, Cupertino, CA (US); Mira S. Misra, Los Gatos, CA (US); Clarisse Mazuir, San Jose, CA (US); Malcolm J. Northcott, Fremont, CA (US); Albert J. Golko, Saratoga, CA (US); Daniel J. Reetz, Sherman Oaks, CA (US); Matthew E. Last, San Jose, CA (US); Thaddeus Stefanov-Wagner, Santa Clara, CA (US); Christopher J. Sataline, San Jose, CA (US); Michael A. Cretella, San Jose, CA (US); Collin J. Palmer, Malta, NY (US)

( * ) Notice: Subject to any disclaimer, the term of this patent is extended or adjusted under 35 U.S.C. 154(b) by 0 days.

(21) Appl. No.: 15/552,536

(22) PCT Filed: Aug. 18, 2017

(86) PCT No.: PCT/US2017/047653
§ 371 (c)(1),
(2) Date: Aug. 22, 2017

(87) PCT Pub. No.: WO2018/035484
PCT Pub. Date: Feb. 22, 2018

(65) Prior Publication Data
US 2019/0164344 A1     May 30, 2019

Related U.S. Application Data

(60) Provisional application No. 62/376,737, filed on Aug. 18, 2016.

(51) Int. Cl.
*B60R 25/31* (2013.01)
*B60R 16/037* (2006.01)
(Continued)

(52) U.S. Cl.
CPC ............ *B60R 16/0373* (2013.01); *B60Q 1/50* (2013.01); *B60R 25/24* (2013.01); *B60R 25/31* (2013.01);
(Continued)

(58) Field of Classification Search
CPC .. B60Q 2400/50; B60Q 1/50; B60Q 2400/40; B60R 25/31; B60R 16/0373; B60R 25/24; G06T 7/70
See application file for complete search history.

(56) References Cited

U.S. PATENT DOCUMENTS 8,509,488 B1 *  8/2013  Enge ................. G01C 21/3623
                                                        382/106
8,542,108 B1 *  9/2013  Izdepski ................. G09G 5/00
                                                        340/461

(Continued)

FOREIGN PATENT DOCUMENTS

DE     102012024513     7/2013
WO     WO 2014/086992     6/2014
WO     WO 2014/209328     12/2014

*Primary Examiner* — Phong X Nguyen
(74) *Attorney, Agent, or Firm* — Polsinelli PC

(57) ABSTRACT

Aspects of the present disclosure involve projecting an interactive scene onto a surface from a projecting object. In one particular embodiment, the interactive scene is projected from a vehicle and may be utilized by the vehicle to provide a scene or image that a user may interact with through various gestures detected by the system. In addition, the interactive scene may be customized to one or more preferences determined by the system, such as user preferences, system preferences, or preferences obtained through feedback from similar systems. Based on one or more user inputs (Continued)

(such as user gestures received at the system), the projected scene may be altered or new scenes may be projected. In addition, control over some aspects of the vehicle (such as unlocking of doors, starting of the motor, etc.) may be controlled through the interactive scene and the detected gestures of the users.

23 Claims, 7 Drawing Sheets

(51) Int. Cl.
 *B60Q 1/50* (2006.01)
 *B60R 25/24* (2013.01)
 *G06T 7/70* (2017.01)

(52) U.S. Cl.
 CPC ............ *G06T 7/70* (2017.01); *B60Q 2400/40* (2013.01); *B60Q 2400/50* (2013.01)

(56) References Cited

U.S. PATENT DOCUMENTS

| | | | | |
|---|---|---|---|---|
| 9,536,197 | B1* | 1/2017 | Penilla | G06F 3/167 |
| 9,616,802 | B1* | 4/2017 | Kiriyama | B60Q 1/0023 |
| 9,707,911 | B1* | 7/2017 | Myers | B60R 16/037 |
| 9,707,912 | B1* | 7/2017 | Pena Casimiro | B60Q 1/2665 |
| 10,134,280 | B1* | 11/2018 | You | B60Q 1/34 |
| 2003/0212480 | A1* | 11/2003 | Lutter | B60R 21/013 |
| | | | | 701/31.4 |
| 2004/0114921 | A1* | 6/2004 | Braun | B60Q 9/008 |
| | | | | 396/661 |
| 2004/0119628 | A1* | 6/2004 | Kumazaki | B60R 25/2009 |
| | | | | 341/176 |
| 2007/0182538 | A1* | 8/2007 | Ota | B60R 25/1009 |
| | | | | 340/506 |
| 2008/0296926 | A1* | 12/2008 | Hanzel | H03K 17/941 |
| | | | | 296/146.1 |
| 2011/0235870 | A1* | 9/2011 | Ichikawa | G06F 21/83 |
| | | | | 382/118 |
| 2012/0194356 | A1* | 8/2012 | Haines | B60Q 1/323 |
| | | | | 340/933 |
| 2013/0130674 | A1* | 5/2013 | De Wind | B60Q 1/2696 |
| | | | | 455/420 |
| 2014/0197922 | A1* | 7/2014 | Stanwood | G06F 21/32 |
| | | | | 340/5.83 |
| 2014/0218212 | A1* | 8/2014 | Nykerk | B60Q 1/0023 |
| | | | | 340/901 |
| 2014/0236483 | A1* | 8/2014 | Beaurepaire | G01C 21/3626 |
| | | | | 701/533 |
| 2014/0303899 | A1* | 10/2014 | Fung | B60R 25/25 |
| | | | | 702/19 |
| 2014/0320823 | A1* | 10/2014 | Ammar | G03B 29/00 |
| | | | | 353/13 |
| 2015/0032328 | A1* | 1/2015 | Healey | G06Q 30/0241 |
| | | | | 701/36 |
| 2015/0077237 | A1* | 3/2015 | Chou | G06F 3/0483 |
| | | | | 340/439 |
| 2015/0081169 | A1 | 3/2015 | Pisz | |
| 2015/0203023 | A1* | 7/2015 | Marti | B60Q 1/503 |
| | | | | 340/425.5 |
| 2015/0298598 | A1* | 10/2015 | Nussli | B60Q 1/2665 |
| | | | | 345/2.2 |
| 2016/0159274 | A1 | 6/2016 | Salter et al. | |
| 2016/0187995 | A1* | 6/2016 | Rosewall | H04W 4/02 |
| | | | | 345/156 |
| 2016/0191872 | A1* | 6/2016 | Wang | H04N 9/3179 |
| | | | | 348/744 |
| 2016/0207443 | A1* | 7/2016 | Widdowson | B60Q 1/0011 |
| 2016/0269401 | A1* | 9/2016 | Saito | G07C 9/20 |
| 2017/0106783 | A1* | 4/2017 | Fritz | B60Q 1/18 |
| 2017/0106793 | A1* | 4/2017 | Kumar | B60Q 9/005 |
| 2017/0106836 | A1* | 4/2017 | Sobecki | G06F 3/04817 |
| 2017/0140651 | A1* | 5/2017 | Lee | G08G 1/166 |
| 2017/0169641 | A1* | 6/2017 | Ziegler | G07C 9/00309 |
| 2019/0016257 | A1* | 1/2019 | Sakata | B60Q 1/50 |

* cited by examiner

SYSTEM AND METHOD FOR INTERACTIVE SCENE PROJECTION

CROSS REFERENCE TO RELATED APPLICATIONS

This Patent Cooperation Treaty (PCT) application is related to and claims priority to U.S. Patent Application No. 62/376,737 filed Aug. 18, 2016, titled "SYSTEM AND METHOD FOR INTERACTIVE SCENE PROJECTION," the entire contents of each are incorporated herein by reference for all purposes.

TECHNICAL FIELD

This disclosure relates generally to light and image projection, and more specifically to controlling the projection of an interactive scene from a vehicle.

BACKGROUND

Many vehicles, especially current automobile designs, include some welcoming scenarios to approaching passengers. For example, many vehicles execute a sequence of blinking lights (such as through one or more hazard lights or headlights of the vehicle) when the vehicle receives a signal from an associated key fob. Other vehicles may unlock the doors of the vehicle and/or turn on the interior lights of the vehicle when the signal is received. However, such displays are often passive displays preprogrammed to execute when the signal of the approaching passenger is received. Further, such displays are often limited to just a few display options utilizing the existing lighting systems used by the vehicle during operation. It is with these and other issues in mind that various aspects of the present disclosure were developed.

SUMMARY

One implementation of the present disclosure may take the form of a system for projecting an image onto a surface near a vehicle. The system may include a presence detector that detects the presence of a user within a distance threshold of a projection system integrated with a vehicle, the presence detector comprising a proximity sensor and a recognition system to determine an identity of the detected user, a projection controller in communication with the presence detector to receive the determined identity of the detected user, and an image projector in communication with the projection controller, wherein the projection controller transmits one or more instructions to the image projector to display an interactive image onto the surface within a vicinity of the vehicle based at least on the identity of the detected user.

Another implementation of the present disclosure may take the form of a method for projecting an image from a projection system. The method may include the operations of detecting the presence of a user within a distance threshold of a projection system integrated with a vehicle through one or more proximity sensors, obtaining user information comprising a user identification associated with the projection system, and projecting an initial interactive scene onto a surface within a vicinity of the vehicle based at least on the user information. The method may also include the operations of receiving at least one user input at the projection system from the detected user and altering the initial interactive scene based on the at least one user input.

DETAILED DESCRIPTION

Aspects of the present disclosure involve systems, methods, devices, and the like, for projecting an interactive scene onto a surface from a projecting object. In one particular embodiment, the interactive scene is projected from a vehicle. In general, the projected interactive scene may be utilized by the vehicle to provide a scene or image that a user may interact with through various gestures detected by the system. In addition, the interactive scene may be customized to one or more preferences determined by the system, such as user preferences, system preferences, or preferences obtained through feedback from similar systems. To provide the interactive scene, the vehicle may utilize several inputs to project an initial scene and alter the scene in response to the inputs. For example, the projection system may detect the presence of a user near the system and project an initial scene accordingly. Further, the system may retrieve information from an external network, environmental sensors, and/or a database of settings of preferences to determine the initial scene to project. Based on one or more user inputs (such as user gestures received at the system), the projected scene may be altered or new scenes may be projected. In addition, control over some aspects of the vehicle (such as unlocking of doors, starting of the motor, etc.) may be controlled through the interactive scene and the detected gestures of the users. Thus, through the projection of the interactive scene and the detection of a user's engagement with the scene, a user experience with a vehicle or other projection system may be provided.

Figure 1:
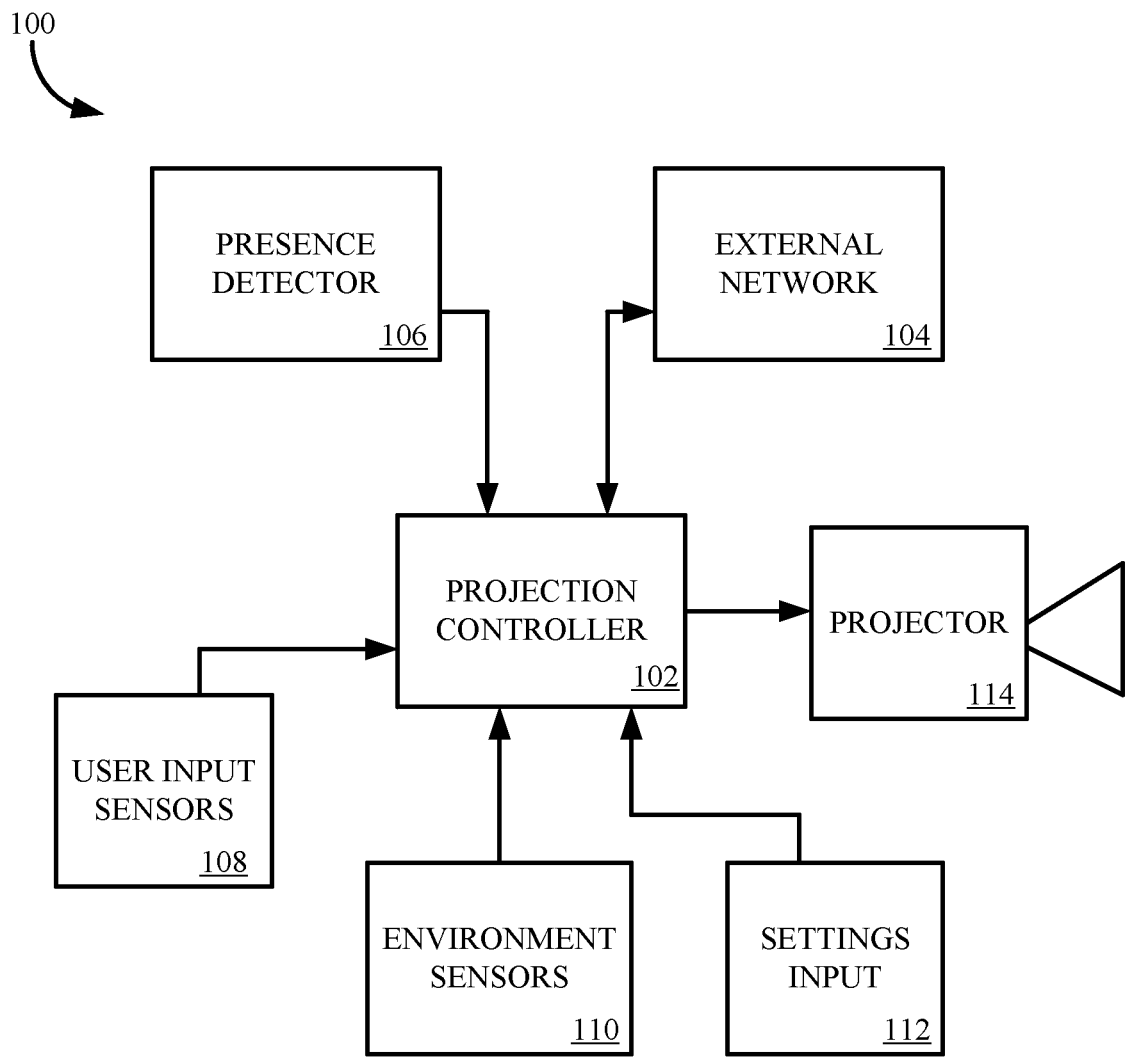
FIG. 1 is a diagram of a system for a vehicle to project an interactive scene onto a surface for interaction with a user of the projection system.

FIG. 1 is a diagram of a system 100 for a vehicle or other object to project an interactive scene onto a surface for interaction with a user of the system. In general, the projection system 100 provides for a ground (or other surface) projection that can act as a display for a computer, with one or more gesture sensors as inputs to control the computer. For example, the projected scene may be an interface to a vehicle, the Internet, a closed network or computers, other connected hardware, etc. that is controlled by the gestures of the user and displayed through the projected scene. Any computing device or networks of devices may be controlled through the gesture detection and projected display of the projection system 100 of FIG. 1. In one particular embodiment, the projection system 100 is integrated into or otherwise associated with a vehicle, and more particularly an autonomous vehicle to allow a user of the projection system 100 to interact with the vehicle to control one or more aspects of the vehicle. As should be appreciated, however, the projection system 100 of FIG. 1 may be in communication with any computing device or network to control the components of the network.

The projection system 100 includes a projection controller 102 device. In general, the projection controller 102 receives inputs and/or communicates with a network through one or more input/output ports and controls a projector or other image projecting device in response to the information obtained from the inputs or the network. The projection controller 102 may be any type and number of computing devices, such as that described below with reference to FIG. 9. In one embodiment, the projection controller 102 is integrated with or otherwise associated with an autonomous vehicle or other type of vehicle to interact with a user of the vehicle.

As mentioned, the projection controller 102 may communicate with a projector 114 or other type of image creator. The projector 114 may be any device which projects an image onto a surface. In general, the image may be projected on any surface by the projector 114, including vertical surfaces, horizontal surface, angled surfaces, rounded surfaces, and the like. For example, a bright image projector 114, such as a laser painter, may be utilized by the system 100. In general, the illumination of the image may be bright enough to produce a significant contrast compared to the surrounding medium, through the use of high intensity, and/or colored lights. These illumination sources include visible light laser sources which can rapidly paint shapes faster than they eye can process, or high illuminance projectors which can focus an image at various distances. In one particular implementation, a direct scan laser device or devices may form an image by reflecting laser beams off of a fast tip-tilt Micro-Electro-Mechanical System (MEMS) mirror which can scan through the angular area of an image faster than a human can perceive the motion. Contrast of intensity and color in the image can be made by a variety of ways, either by controlling the time spent at a particular angle through the scan mirror slew rate, or by varying the brightness of the laser synchronized to the angular displacement. In another implementation, a wavefront phase manipulation system may be utilized to project the image onto a surface. Such a system may provide for a dynamic volumetric projection with a large field of focus that enables the system to project image information over a complex surface with variable standoff distances while maintaining focus of the image.

The projector 114 may be embodied with the vehicle such that the image may be projected in any direction from the vehicle. Further, in some instances, the vehicle may include multiple projectors 114 so that images may be projected around the vehicle from the multiple projectors. In this embodiment, the projection controller 102 may be configured to control each of the multiple projectors to project the image. Thus, the projectors 114 may be operated to work together to project the image, or different images may be projected from each of the projectors to interact with multiple users of the system 100 simultaneously. For example, two or more projectors 114 may project the same image to overlay the images and create a brighter image on the projection surface. In another example, the projection system 100 may utilize one or more sensors (such as proximity sensors 106) to determine when a projected image is blocked by an object or person in between the projector 114 and the projection surface. In this example, a second (or more) projector may fill in or otherwise project the blocked image so that the full image may be projected by the system 100. Although only one projector 114 is illustrated in FIG. 1, it should be appreciated that the projection system 100 may include any number of such projectors controlled by a single projection controller 102 or multiple projection controllers. In one particular example, the projector 114 or projectors are integrated within the body of the vehicle such that the projector does not extend from the vehicle body.

The projection controller 102 may receive input from several sources that control the projected interactive scene. For example, the projection system 100 may include a presence detector 106 that determines the presence of a user of the system. In one embodiment, the presence detector 106 includes a proximity sensor such as a camera that detects a person within the field of view of the camera. Other proximity sensors 106 may also be used with the presence detector, such as infrared sensors, a microphone or other noise recognition system, motion sensors, accelerometers or other inertial sensors, LIDAR, RADAR, ultrasonic systems or other object detection systems, capacitance sensors, and the like. In general, any sensor to detect the presence of a user or object near the projection system 100 may be used. In another embodiment, the presence detector 106 may receive a location signal from a wearable device or other mobile device that is carried by the user of the system such that the particular distance from the presence detector to the mobile device of the user may be determined. Such a distance may be calculated, in one example, by measuring the strength of a signal transmitted by the mobile device at the presence detector. In another example, the system 100 may determine a distance by calculating a "time-of-flight" between a location of a device providing a signal and a location of the receiving system. In particular, the transmitting device may include a timestamp of other identifying feature in the signal that is synched with the receiving device (such as a Global Positioning System (GPS) signal). When the signal from the transmitter is received, the receiving device may calculate the time between the transmission of the signal and receiving the signal to calculate a distance to the transmitting device. Regardless of the technique utilized, the projection system 100 may determine a presence of a user or object near the projection system.

In addition to determining a presence of a user, the presence detector 106 may also include one or more algorithms to determine an identity of a detected user. For example, the presence detector 106 may include facial recognition software or devices that analyse the facial features of a user near the system 100 to determine the user's identity. Thus, the presence detector 106 may include one or more computing devices or components to execute an algorithm or program to determine a detected user's identity. Once the facial information of a person near the system 100 is obtained, the system may compare the information to one or more facial profiles stored in a database associated with the system to determine the identity of the person. In a similar manner, other types of recognition systems may also be included with the system 100, such as corneal recognition, gait recognition, thermal recognition, voice recognition, and the like. In general, any known or hereafter developed system or method for determining the identity of a person may be used by the system 100 to determine the identity of a detected user. Likewise, the mobile or wearable device associated with a user and detected by the system 100 may be used to determine the identity of the user in proximity to the system. For example, the user may log into or otherwise indicate to the mobile device of the user's identity. This information may be transmitted or broadcast to the projection system 100 to identify the user to the system.

Similarly, the projection system 100 may include one or more user input sensors 108 to detect an input provided by a user. In general, the user input sensors 108 may be similar to the proximity sensors discussed above. Thus, the user input sensors 108 may include a camera, infrared sensors, a microphone or other noise recognition system, motion sensors, accelerometers or other inertial sensors, LIDAR, RADAR, ultrasonic systems or other object detection systems, capacitance sensors, and the like. Also similar to above, the user input sensor 108 may receive a signal from a mobile or wearable device that indicates a user's input. For example, the mobile device may include accelerometers or other inertial sensors that detect a movement of the mobile device by the user and transmit the user's gesture to the user input sensor 108 of the projection system 100. In general, any movement or other user input may be detected by the mobile or wearable device and provided to the user input sensor 108 to act as the user input. Various devices and methods for detecting user inputs are described in further detail below.

In addition to the presence detector 106 and the user input sensors 108, one or more environmental sensors 110 may also be included in the projection system 100. In general, the environmental sensors 110 may determine an environmental condition around or near the projection system 100 or vehicle in which the system is included. For example, the environment sensors 110 may determine an estimated time of day based on detected sunlight around a vehicle. Similarly, the environment sensors 110 may determine a weather condition, such as rain, snow, wind, etc. around the vehicle. Regardless of the type of sensors and the measured condition, the information obtained from the environment sensors 110 may be provided to the projection controller 102. This environment information may be utilized by the projection controller to determine or select an interactive scene to project from the projector 114 onto the surface.

In a similar manner, the projection controller 102 may access a database storing one or more user or system settings provided to the system through a setting input 112. As explained in more detail below, the settings of the system 100 may indicate one or more user or system preferences for projecting an interactive scene from the system. For example, a user of the system 100 may utilize the settings input 112 to select an initial interactive scene from a variety of initial interactive scene options. This selected initial interactive scene may be stored in a database associated with the system 100 for reference by the system when a user is detected by the system. Other examples of user and/or system settings are described below with reference to FIGS. 2-7.

The projection controller 102 of the projection system 100 may also be in communication with an external network 104. In one embodiment, the projection controller 102 may access one or more public networks through the external network 104 or may access one or more private networks. For example, the projection controller 102 may communicate with one or more application servers of a network. The application servers may of the external network 104 may receive information from and provide information to the projection controller 102 for use when projecting an interactive scene. Such information may include system preferences, new interactive scenes, applications executed by the projection controller 102 and displayed by the projector 114, environmental information, security protocols, software updates, maps, suggested routes to a destination, headline news, interesting events nearby, deals to local stores, and the like. In general, because the projection system 100 may act as a computing device with the projected scene as the computer display, any information obtained from an external network (either public or private) by a computing device may also be obtained through the external network 104 of the projection system 100.

Figure 2:
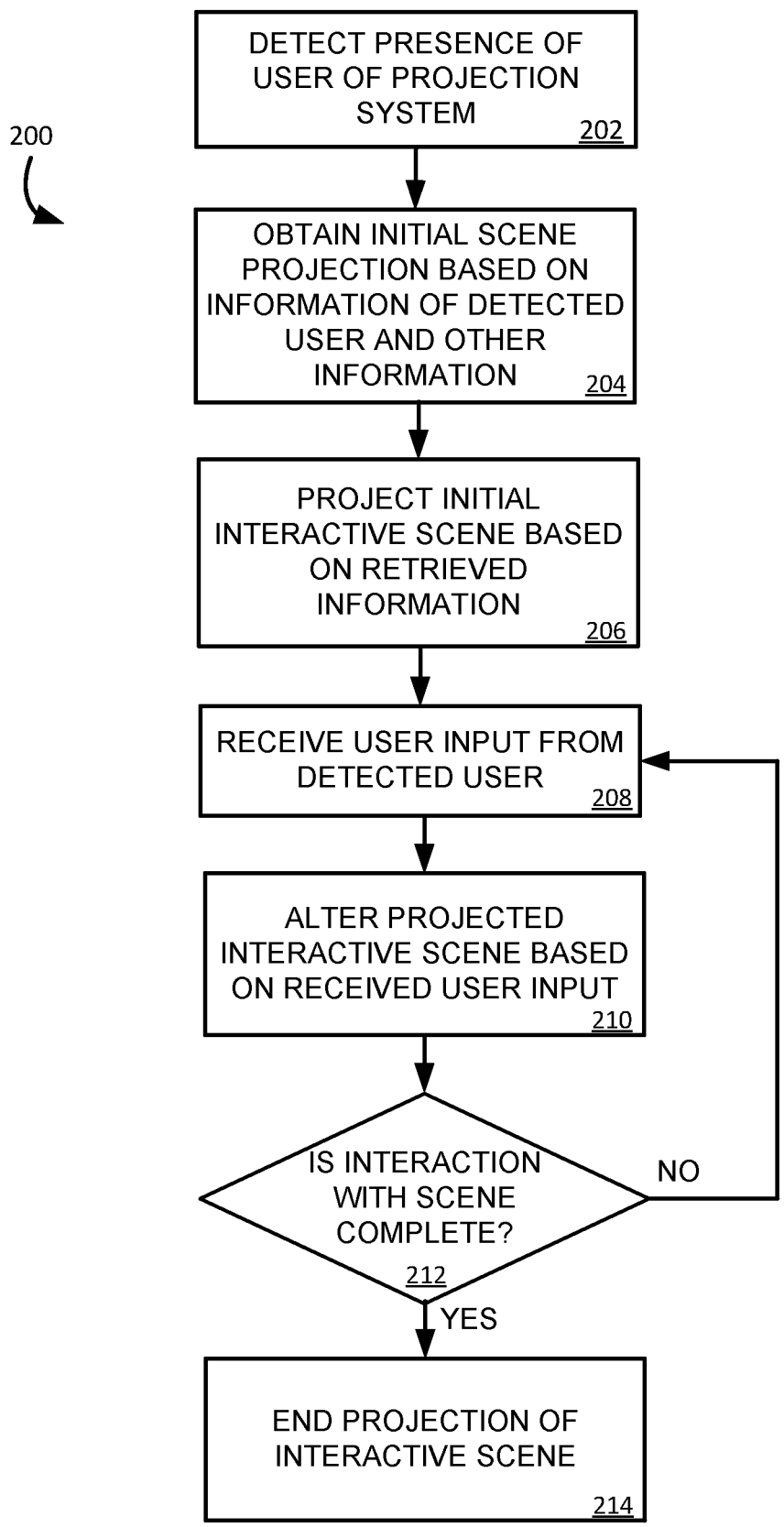
FIG. 2 is a flowchart of a method for a vehicle to project an interactive scene onto a surface for interaction with a user of the projection system.

Utilizing the system 100 of FIG. 1, an interactive scene may be projected onto one or more surfaces through which a user may provide inputs to control the scene. In one particular embodiment, a vehicle may incorporate the system 100 to provide an interactive scene to enhance a user's experience with the vehicle. FIG. 2 is a flowchart of a method 200 for a vehicle to project an interactive scene onto a surface for interaction with a user of the projection system 100. The operations of the method 200 of FIG. 2 may be performed by one or more components of the projection system 100 to provide the interactive scene to the user. Other additional components not illustrated in the system 100 of FIG. 1 may also perform one or more of the operations described. Further, the operations may be performed utilizing hardware components, software programs, or a combination of hardware and software.

Beginning in operation 202, the projection system 100 detects the presence of a user of the system. As explained above, the projection system 100 may include one or more presence detector 106 to determine the presence of a user of the system. For example, a driver and/or passenger of a vehicle may approach a vehicle and the system 100, utilizing a camera or other proximity sensor associated with the presence detector 106, may detect the presence of the driver/passenger near the vehicle. In another embodiment, the user may carry a mobile device, such as a smart phone or wearable device, which indicates the user's position relative to the vehicle. In addition to determining a presence of a user, the presence detector 106 may also determine an identity of a detected user. For example, the presence detector 106 may identify the mobile device with a particular user and associate the detected user with that mobile device identity. In general, any known or hereafter developed sensor may be utilized to detect the presence of a user approaching the vehicle and/or to determine the identity of the approaching user.

Figure 3:
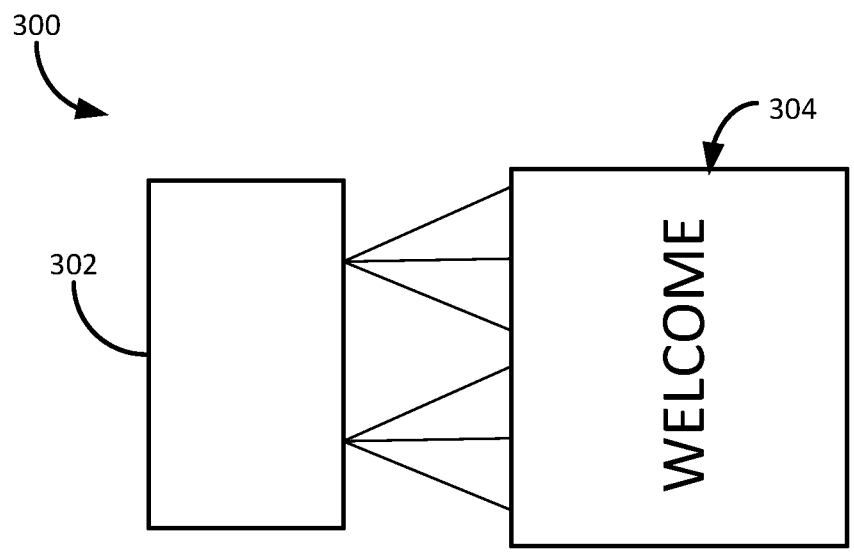
FIG. 3 is a diagram illustrating projecting a welcoming interactive scene from a vehicle.

In operation 204, the projection system 100 obtains an initial scene projection from a selection of potential initial scenes based on the information obtained concerning the detected user and one or more other sources of information. Further, in operation 206, the projection system 100 may project the selected initial interactive scene onto a surface near the projection system based on the retrieved information. For example, FIG. 3 is a diagram 300 illustrating projecting a welcoming interactive scene 304 from a vehicle 302. The welcoming scene 304 is one example of an initial interactive scene that may be projected by the projection system 100 in respond to detecting the presence of a user near the vehicle. In general, the welcoming scene 304 is designed to provide a visual experience to a user as they approach the vehicle. However, any type of initial interactive scene 304 may be projected by the vehicle in response to detecting the user. For example, many initial scenes may be available to be projected by the vehicle 302. Different users (drivers or passengers) of the vehicle may select or otherwise indicate a preferred initial interactive scene to be projected when the user approaches the vehicle 302. Thus, the projection system 100 may utilize the identification information obtained of the approaching user to determine which initial interactive scene 304 is projected. The user preferences may be provided to the projection system 100 through the settings input 112 of the system. Alternatively, the projection system 100 may receive the initial interactive scene to be projected from one or more external sources through the external network 104. In general, the initial interactive scene 304 may include any projected image. Several examples of such initial interactive scenes are discussed in more detail below. Further, although only one initial interactive scene 304 is illustrated in FIG. 3, it should be appreciated that any number of such scenes may be projected, with each projected scene being based on the detection and identification of the approaching user.

In addition to the identification information obtained about the user, the projection controller 102 may use other information to determine the initial projected scene 304. For example, the initial scene 304 may include portions displaying information concerning the vehicle (such as battery state, vehicle performance information, temperature/humidity of the cabin), environmental information (current temperature, predicted weather conditions, traffic patterns in the nearby areas or along common routes), news headlines, information concerning local shops, a likely destination of the driver, and the like. This information may be provided to or obtained by the projection controller 102 through the external network 104. In one embodiment, information may be provided to the projection controller 102 through the external network 104 from a mobile device or other computing device associated with the detected user.

In some instances, the projection system 100 may not be able to determine the identity of the person approaching the vehicle. In such circumstances, the initial interactive scene may be selected according to the non-identification of the approaching person. For example, the projected initial scene may include a warning to the unidentified person that the vehicle is alarmed and to not approach. In another example, the vehicle may provide an initial scene that provides an advertisement for a nearby shop to the unidentified person. Further still, the vehicle may provide some indication of the location of the unidentified person to an identified user as the user approaches the vehicle. In other words, the vehicle may warn the driver of the vehicle that an unidentified person is detected near the vehicle and/or provide an approximate location of the unidentified person in relation to the driver. In still other instances, the vehicle may not be a user's private vehicle, such as a rented vehicle or a rideshare vehicle. In this example, the identity of the person approaching the vehicle may trigger the projection system 100 to provide an advertisement to rent or drive the vehicle upon detection of the presence of the person. Further, a rental vehicle may be loaded with a user's information (such as through a wireless communication once the user has agreed to rent the vehicle) such that the vehicle may welcome the person to the vehicle as the person approaches the vehicle. Again, the initial scene projected in response to the detection of an unidentified person may be retrieved from a database or from the external network 104 by the projection controller 102.

As mentioned above, the scene projected by the projection system 100 may be interactive in that the scene may be adjusted based on one or more inputs provided by a user of the system. As such, the projection system 100 may receive an input from a user of the scene in operation 208 of the method 200 of FIG. 2. The user input may be received through one or more of the user input sensors 108 described above. For example, the system 100 may detect a gesture or other movement of the user (such as through a camera system or through a mobile device carried by the user) and/or an audio input (through a microphone and/or voice recognition software). In other words, the user may interact with the projected scene to provide inputs to the projection system 100. Further, in operation 210, the projected scene may be altered in response to the user input. In this manner, a user may interact with the projected scene in a similar manner as a user may interact with a display of a computing device utilizing an input device, through a gesture or movement in relation to the scene, and/or through one or more voice commands received through a microphone of the projection system 100.

Figure 4:
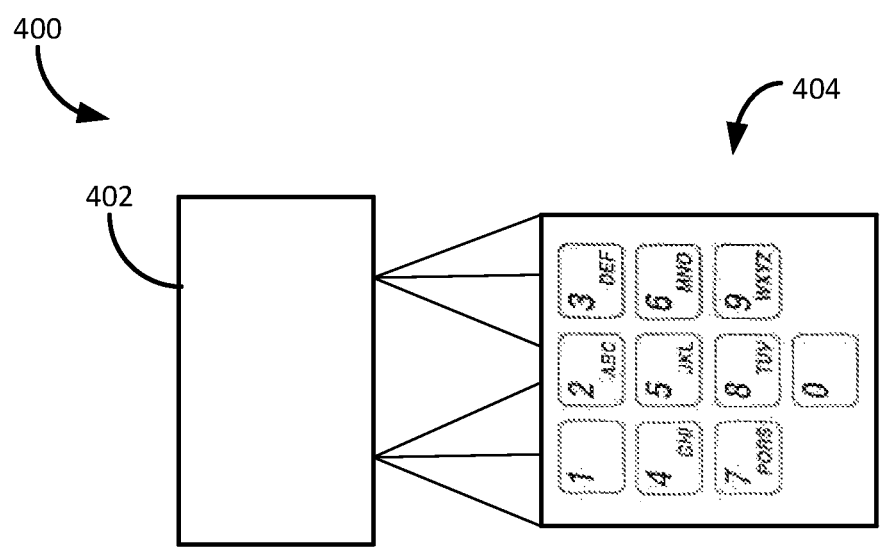
FIG. 4 is a diagram illustrating projecting an access interface interactive scene from a vehicle.

One particular example of an interactive scene is illustrated in FIG. 4. In particular, FIG. 4 is a diagram illustrating projecting an access interface interactive scene 404 from a vehicle 402. In this embodiment, the projected scene 404 includes a numerical keypad. However, it should be appreciated that the scene 404 may include any image. Further, the numerical keypad or other interactive portion of the scene may form a portion of the initial scene or may be a newly projected interactive scene after the initial scene. Upon projection, the approaching user may indicate a passcode utilizing the scene. For example, the user may voice activate the code which is detected by a microphone or other audio gathering sensor of the system 100. Voice recognition software may then determine what the user says and alter the interactive scene accordingly. For example, the announced number may be highlighted within the interactive scene as the user says the number. In another example, the user may step or press a portion of the interactive scene to select a projected number. A camera or other imaging-capturing device may detect which button on the keypad the user is selecting and alter the interactive scene accordingly. In another example, a LIDAR system or other type of depth measurement device such as a RADAR system may be utilized to detect the user's position within the scene. In this manner, a user may interact with the projected scene to provide one or more inputs to the projection system 100. In this example, a correct passcode entered into the projection system 100 through the projected scene may unlock the vehicle door to allow access to the vehicle for the driver. As explained in more detail below, however, any interactive scene may be altered in response to one or more inputs provided to the projection system 100 by a user.

In operation 212, the projection system 100 determines if the interaction with the interactive scene is complete. For example, the driver may enter the vehicle and close the door, which indicates that the driver may no longer interact with the scene. If the interaction with the scene continues, the projection system 100 returns to operation 208 to receive additional inputs from the user. If the interaction is complete, however, the projection system continues to operation 214 and ends the projection of the interactive scene. Thus, through the method 200 of FIG. 2, a driver or passenger of a vehicle may interact with one or more projected scenes from the projection system 100.

As should be appreciated, the various types and interactions of the projected interactive scenes are endless. Below are a few examples of interactive scenes which may be projected by the projection system. However, such examples should not be considered as encompassing all of the possibilities of the projected interactive scene. Rather, the projected scene may act a display for any type of computing device and the variations of projected scenes may be as diverse as the displays of computing devices. Further, applications may be created for use by the projection system 100 that increases the capabilities and interactions that may be experienced through the projection system 100.

As mentioned above, the initial projection scene (such as that illustrated in FIG. 3) may include any image and/or may be projected onto any surface. In addition to the welcome interactive scene 304 discussed above, other welcoming scenarios are also contemplated. For example, one initial interactive scene may include a red carpet image. The red carpet image may unfurl or otherwise be animated as the identified user approaches the vehicle. In addition, as the identified user interacts with the scene 304, the interactive scene may be altered. For example, as the person walks on the projected carpet surface, the projected image may interact with the person or sound effects may be emitted from the vehicle. Such interactions may include sparks or other dynamic animations at or near the user's feet during a step or sound effects of cheering people or flashing lights may be activated. In this or a similar manner, an interactive initial scene may interact with a user. In another example, door mats may be projected in front of each door of the vehicle and a received gesture from a driver or passenger may indicate which of the doors to be unlocked by the system for entry into the vehicle.

The types and contents of the initial projected scene may be selectable as a preferred initial scene for an identifiable user of the vehicle through the setting input 112. In one embodiment, the preferred initial scene for several users may be collected at a central server of the external network 104 and shared with other projection systems 100. In this manner, popular selected initial projection scenes 304 may be provided to projection controllers 102 and/or suggested to users of projection systems in communication with the central server.

In addition to a welcoming initial interactive scene, the projection system 100 may also highlight one or more potential objects of interest around the vehicle as the user approaches. For example, as a driver or passenger of the vehicle approaches, objects that may be of interest to a vehicle user such as rocks on the ground, low hanging limbs from a tree, patches of ice, puddles, and the like may be illuminated by the projection system 100. This illumination may aid the user in avoiding such objects. In addition, one or more sound effects may accompany the illumination of the object. For example, a unique sound alert or verbal phrase may be emitted from the system 100 upon detection of the user(s), alerting the user(s) of illuminated object.

Figure 5:
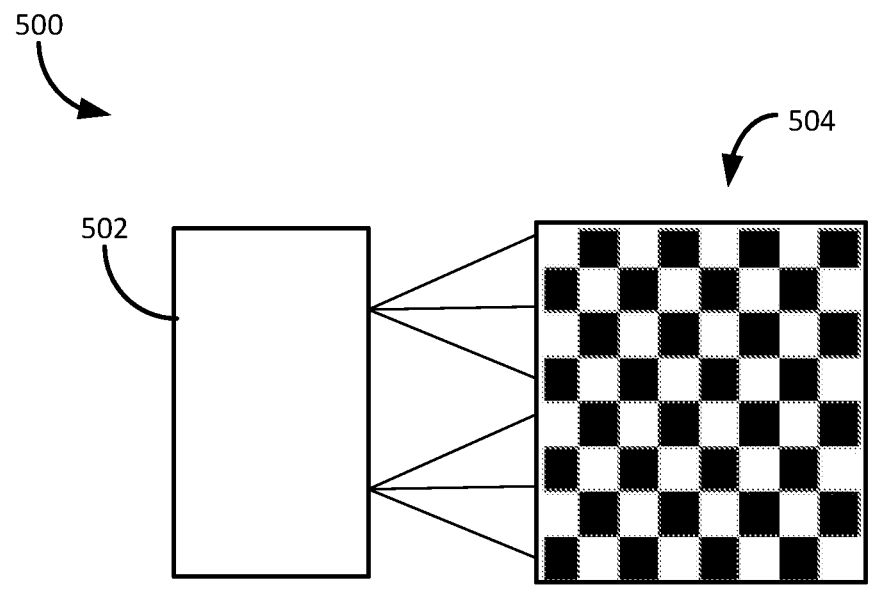
FIG. 5 is a diagram illustrating projecting a game interface interactive scene from a vehicle.

In one particular example illustrated in FIG. 5, a projected game board 504 is projected on a surface, such as the street or a field. Interaction with game board 504 may occur to play a game on the game board projected scene. For example, the user input sensors may detect when body parts of players or other physical objects interact with the projected game board pattern or projected objects. Further, the game board 504 may react or be altered according to the detected player movement. For example, the projections system 100 may project a chessboard 504 from the vehicle 502 on a surface. The chessboard 504 may include the chess pieces. One or more users of the system 100 may interact with the chess pieces to move them and play the game. In one example, the user may gesture to grab a piece and move the piece accordingly. The system 100 may interpret this gesture and alter the projected scene to move the chess piece. In another example, the user may issue a voice command that is received by the system 100 to indicate a chess piece to move and the piece according to the received command. Practically any board game or other game may be projected and an interaction with the game board may be detected and the projection altered accordingly.

Figure 6:
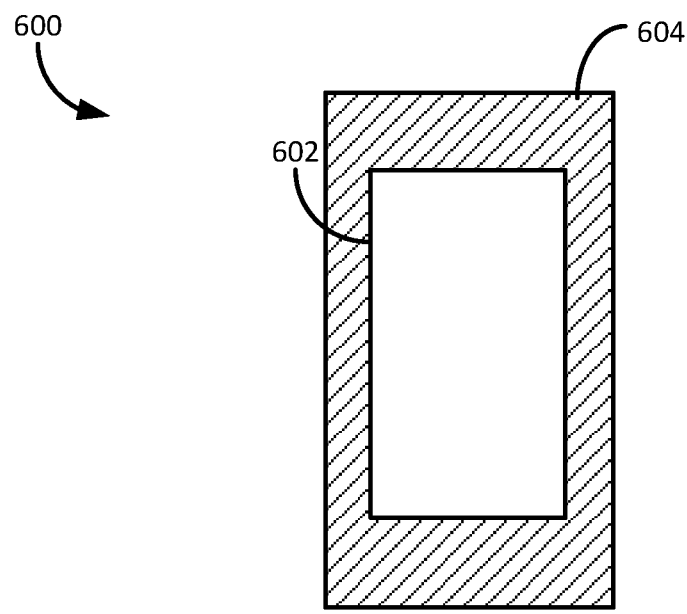
FIG. 6 is a diagram illustrating projecting an exiting interactive scene from a vehicle.

In addition to providing a projected scene when a user or other person approaches the vehicle, the projection system 100 may also provide one or more interactive scenes as users exit the vehicle. In general, any of the above described functions of the projection system 100 may be utilized during exit of the vehicle as well as during approach to the vehicle. Further, FIG. 6 is a diagram 600 illustrating projecting an exiting interactive scene 604 from a vehicle 602. For example, upon opening a door of the vehicle 602 to exit the vehicle, an image 604 indicating an area may be projected onto a pavement surface or other surface around the vehicle. The projected image 604 may define a border around the vehicle 602. In the example illustrated in FIG. 6, the border image 604 may be demarcated by including a crosshatching pattern of some type. As the passengers or drivers are detected by the projection system 100 pass outside the box defined by the projected image 604, the projection system may activate one or more security features, such as sending an indication of the passenger's position to the vehicle at which time the doors of the vehicle may be locked. In this manner, the vehicle 602 may automatically lock the doors by detecting the location of a user in relation to the projected interactive scene with no other indication or action of the user. In addition, a particular gesture or command provided by the driver or passenger may initiate an emergency activation or any other security feature. The emergency sequence may include one or more flashing lights on the vehicle or in a projected image, one or more emitted sounds or alarms, and/or the activation of a video recorder to capture images surrounding the vehicle.

Figure 7:
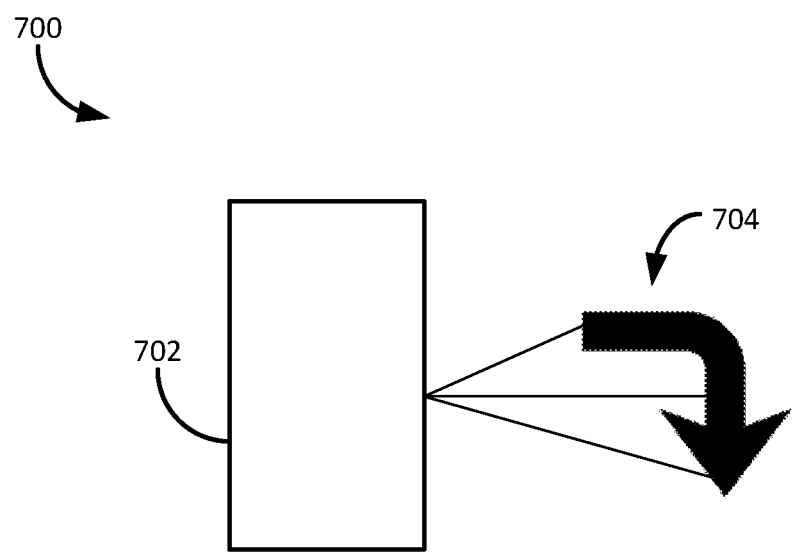
FIG. 7 is a diagram illustrating projecting an interface including directions away from a vehicle.

FIG. 7 is a diagram 700 illustrating projecting an interface 704 including directions away from a vehicle 702. In particular, the projection system 100 may project one or more directions to a final destination as determined by the vehicle 702. For example, a driver of the vehicle 702 may enter a destination into a navigation device or other user interface within the vehicle. Thus, the vehicle may be aware of the final destination of the driver. With this information, one or more directions to reach the final destination may be projected 704 by the projection system 100 onto a surface to instruct the driver or passengers on where to go. In one embodiment (illustrated in FIG. 7), the instructions may include projecting an arrow 704 that indicates the route to be taken. In another example, a map may be projected that illustrates the remaining route to the final destination on the ground or other surface.

In addition to directions, other information may also be projected 704 as a user of the vehicle 702 exits the car. For example, vehicle status information or controls may be projected and interacted with by the user. Vehicle status information may include battery life, gas level, target cabin conditions upon return, musical playlists on queue, and the like. A user may interact with one or more of the projected images to control aspects of the vehicle. For example, the vehicle 702 may project a status of the doors (locked/unlocked). The user may interact with this projected image to select to lock the doors as the driver exits the vehicle. Other information may also be projected, such as weather conditions, relevant news, shopping deals, etc. Through the projection system 100, information may be provided to one or more users of the vehicle 702, as well as control over some aspects of the vehicle may be provided through an interaction with the projected scene.

Figure 8:
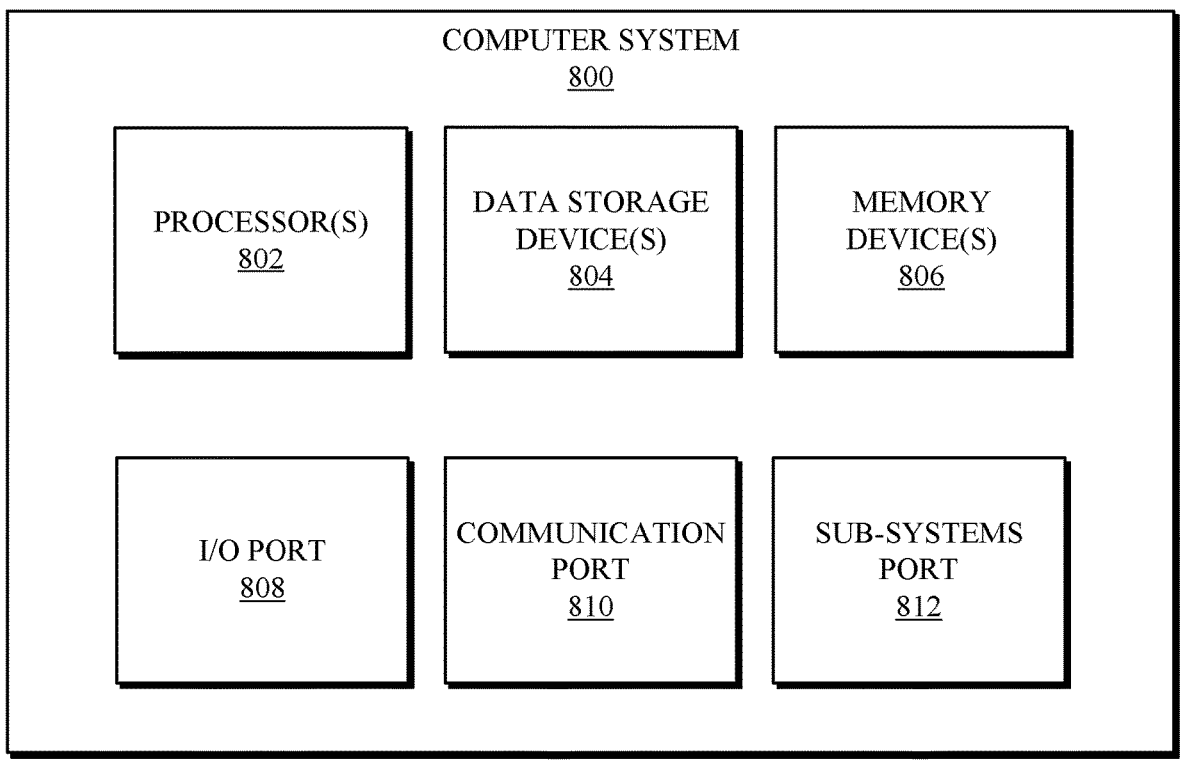
FIG. 8 is a diagram illustrating an example of a computing system which may be used in implementing embodiments of the present disclosure.

Referring to FIG. 8, a detailed description of an example computing system 800 having one or more computing units that may implement various systems and methods discussed herein is provided. The computing system 800 may be applicable to the central server 106 and other computing or network devices. It will be appreciated that specific implementations of these devices may be of differing possible specific computing architectures not all of which are specifically discussed herein but will be understood by those of ordinary skill in the art.

The computer system 800 may be a computing system is capable of executing a computer program product to execute a computer process. Data and program files may be input to the computer system 800, which reads the files and executes the programs therein. Some of the elements of the computer system 800 are shown in FIG. 8, including one or more hardware processors 802, one or more data storage devices 804, one or more memory devices 808, and/or one or more ports 808-812. Additionally, other elements that will be recognized by those skilled in the art may be included in the computing system 800 but are not explicitly depicted in FIG. 8 or discussed further herein. Various elements of the computer system 800 may communicate with one another by way of one or more communication buses, point-to-point communication paths, or other communication means not explicitly depicted in FIG. 8.

The processor 802 may include, for example, a central processing unit (CPU), a microprocessor, a microcontroller, a digital signal processor (DSP), and/or one or more internal levels of cache. There may be one or more processors 802, such that the processor 802 comprises a single central-processing unit, or a plurality of processing units capable of executing instructions and performing operations in parallel with each other, commonly referred to as a parallel processing environment.

The computer system 800 may be a conventional computer, a distributed computer, or any other type of computer, such as one or more external computers made available via a cloud computing architecture. The presently described technology is optionally implemented in software stored on the data stored device(s) 804, stored on the memory device(s) 806, and/or communicated via one or more of the ports 808-812, thereby transforming the computer system 800 in FIG. 8 to a special purpose machine for implementing the operations described herein. Examples of the computer system 800 include personal computers, terminals, workstations, mobile phones, tablets, laptops, personal computers, multimedia consoles, gaming consoles, set top boxes, and the like.

The one or more data storage devices 804 may include any non-volatile data storage device capable of storing data generated or employed within the computing system 800, such as computer executable instructions for performing a computer process, which may include instructions of both application programs and an operating system (OS) that manages the various components of the computing system 800. The data storage devices 804 may include, without limitation, magnetic disk drives, optical disk drives, solid state drives (SSDs), flash drives, and the like. The data storage devices 804 may include removable data storage media, non-removable data storage media, and/or external storage devices made available via a wired or wireless network architecture with such computer program products, including one or more database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, SSDs, and the like. The one or more memory devices 806 may include volatile memory (e.g., dynamic random access memory (DRAM), static random access memory (SRAM), etc.) and/or non-volatile memory (e.g., read-only memory (ROM), flash memory, etc.).

Computer program products containing mechanisms to effectuate the systems and methods in accordance with the presently described technology may reside in the data storage devices 804 and/or the memory devices 806, which may be referred to as machine-readable media. It will be appreciated that machine-readable media may include any tangible non-transitory medium that is capable of storing or encoding instructions to perform any one or more of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the one or more executable instructions or data structures.

In some implementations, the computer system 800 includes one or more ports, such as an input/output (I/O) port 808, a communication port 810, and a sub-systems port 812, for communicating with other computing, network, or vehicle devices. It will be appreciated that the ports 808-812 may be combined or separate and that more or fewer ports may be included in the computer system 800.

The I/O port 808 may be connected to an I/O device, or other device, by which information is input to or output from the computing system 800. Such I/O devices may include, without limitation, one or more input devices, output devices, and/or environment transducer devices.

In one implementation, the input devices convert a human-generated signal, such as, human voice, physical movement, physical touch or pressure, and/or the like, into electrical signals as input data into the computing system 800 via the I/O port 808. Similarly, the output devices may convert electrical signals received from computing system 800 via the I/O port 808 into signals that may be sensed as output by a human, such as sound, light, and/or touch. The input device may be an alphanumeric input device, including alphanumeric and other keys for communicating information and/or command selections to the processor 802 via the I/O port 808. The input device may be another type of user input device including, but not limited to: direction and selection control devices, such as a mouse, a trackball, cursor direction keys, a joystick, and/or a wheel; one or more sensors, such as a camera, a microphone, a positional sensor, an orientation sensor, a gravitational sensor, an inertial sensor, and/or an accelerometer; and/or a touch-sensitive display screen ("touchscreen"). The output devices may include, without limitation, a display, a touchscreen, a speaker, a tactile and/or haptic output device, and/or the like. In some implementations, the input device and the output device may be the same device, for example, in the case of a touchscreen.

The environment transducer devices convert one form of energy or signal into another for input into or output from the computing system 800 via the I/O port 808. For example, an electrical signal generated within the computing system 800 may be converted to another type of signal, and/or vice-versa. In one implementation, the environment transducer devices sense characteristics or aspects of an environment local to or remote from the computing device 800, such as, light, sound, temperature, pressure, magnetic field, electric field, chemical properties, physical movement, orientation, acceleration, gravity, and/or the like. Further, the environment transducer devices may generate signals to impose some effect on the environment either local to or remote from the example computing device 800, such as, physical movement of some object (e.g., a mechanical actuator), heating or cooling of a substance, adding a chemical substance, and/or the like.

In one implementation, a communication port 810 is connected to a network by way of which the computer system 800 may receive network data useful in executing the methods and systems set out herein as well as transmitting information and network configuration changes determined thereby. Stated differently, the communication port 810 connects the computer system 800 to one or more communication interface devices configured to transmit and/or receive information between the computing system 800 and other devices by way of one or more wired or wireless communication networks or connections. Examples of such networks or connections include, without limitation, Universal Serial Bus (USB), Ethernet, Wi-Fi, Bluetooth®, Near Field Communication (NFC), Long-Term Evolution (LTE), and so on. One or more such communication interface devices may be utilized via the communication port 810 to communicate one or more other machines, either directly over a point-to-point communication path, over a wide area network (WAN) (e.g., the Internet), over a local area network (LAN), over a cellular (e.g., third generation (3G) or fourth generation (4G)) network, or over another communication means. Further, the communication port 810 may communicate with an antenna for electromagnetic signal transmission and/or reception. In some examples, an antenna may be employed to receive Global Positioning System (GPS) data to facilitate determination of a location of a machine, vehicle, or another device.

The computer system 800 may include a sub-systems port 812 for communicating with one or more systems related to a vehicle to control an operation of the vehicle and/or exchange information between the computer system 800 and one or more sub-systems of the vehicle. Examples of such sub-systems of a vehicle, include, without limitation, imaging systems, RADAR, LIDAR, motor controllers and systems, battery control, fuel cell or other energy storage systems or controls in the case of such vehicles with hybrid or electric motor systems, autonomous or semi-autonomous processors and controllers, steering systems, brake systems, light systems, navigation systems, environment controls, entertainment systems, and the like.

Figure 9:
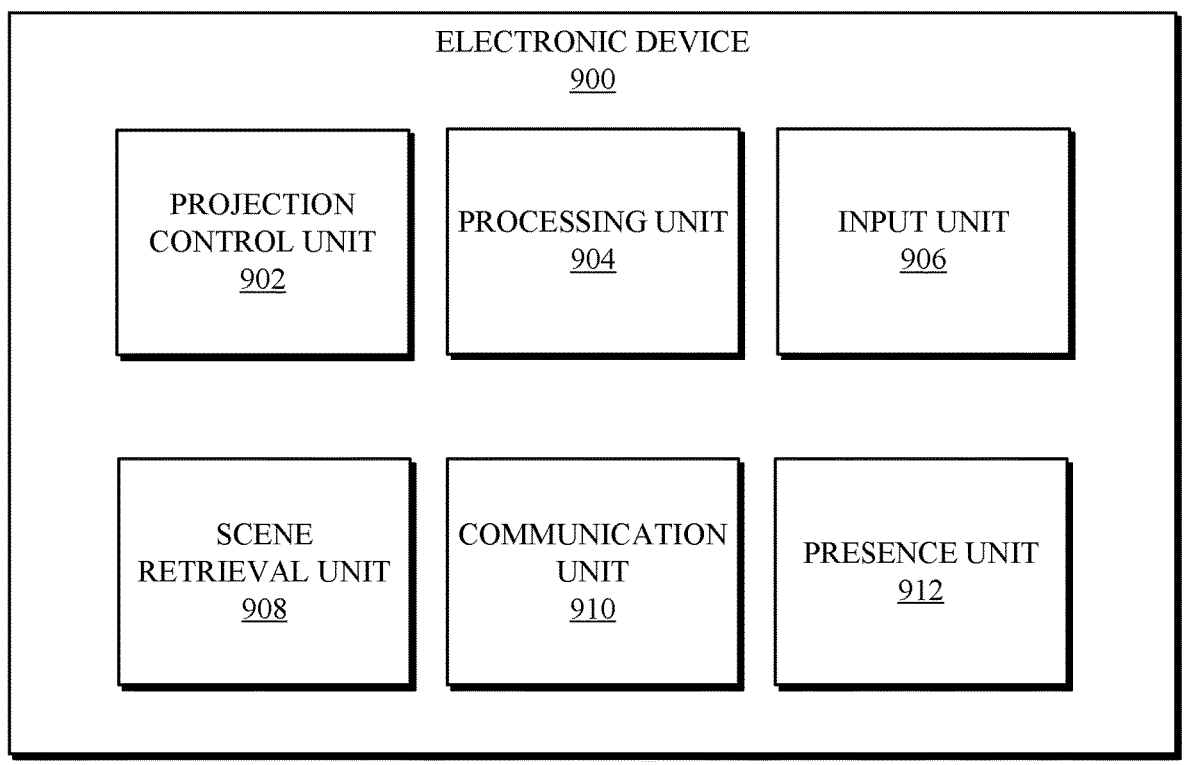
FIG. 9 is a functional block diagram of an example electronic device including operational units arranged to perform various operations of the presently disclosed technology.

Turning to FIG. 9, an example electronic device 900 including operational units 902-912 arranged to perform various operations of the presently disclosed technology is shown. The operational units 902-912 of the device 900 are implemented by hardware or a combination of hardware and software to carry out the principles of the present disclosure. It will be understood by persons of skill in the art that the operational units 902-912 described in FIG. 9 may be combined or separated into sub-blocks to implement the principles of the present disclosure. Therefore, the description herein supports any possible combination or separation or further definition of the operational units 902-912.

In one implementation, the electronic device 900 includes a projection control unit 902 configured to generate and provide one or more instructions to a projector, a processing unit 904 in communication with the projection control unit 902, and an input unit 906 configured to receive data from one or more input devices or systems, such as from a user of the device 900. Various operations described herein may be implemented by the processing unit 904 using data received by the input unit 906 to output information for projection using the projection control unit 902.

Additionally, in one implementation, the electronic device 900 includes units implementing the operations described with respect to FIGS. 1 and 2. For example, scene retrieval of operation 204 may be implemented by a scene retrieval unit 908. The communication unit 910 may receive a user input and presence unit 912 may receive inputs from a presence sensor to determine when a user or other person is near a vehicle. In some implementations, a projection control unit 902 implements various operations for controlling the projection system 100 of a vehicle based on the operations implemented by electronic device 900.

Although discussed above as methods described by the flowchart of FIG. 2, it should be appreciated that one or more operations may be omitted from the methods discussed. Further, the operations may be performed in any order and do not necessarily imply an order as provided. Rather, the methods discussed are merely one embodiment of the present disclosure as contemplated.

The present disclosure recognizes that the use of data may be used to the benefit of users. For example, the location information of a vehicle may be used to provide targeted information concerning a "best" path or route to the vehicle. Accordingly, use of such location data enables calculated control of an autonomous vehicle. Further, other uses for location data that benefit a user of the vehicle are also contemplated by the present disclosure.

Users can selectively block use of, or access to, personal data. A system incorporating some or all of the technologies described herein can include hardware and/or software that prevents or blocks access to such personal data. For example, the system can allow users to "opt in" or "opt out" of participation in the collection of personal data or portions of portions thereof. Also, users can select not to provide location information, or permit provision of general location information (e.g., a geographic region or zone), but not precise location information.

Entities responsible for the collection, analysis, disclosure, transfer, storage, or other use of such personal data should comply with established privacy policies and/or practices. Such entities should safeguard and secure access to such personal data and ensure that others with access to the personal data also comply. Such entities should implement privacy policies and practices that meet or exceed industry or governmental requirements for maintaining the privacy and security of personal data. For example, an entity should collect users' personal data for legitimate and reasonable uses, and not share or sell the data outside of those legitimate uses. Such collection should occur only after receiving the users' informed consent. Furthermore, third parties can evaluate these entities to certify their adherence to established privacy policies and practices.

Embodiments of the present disclosure include various operations or steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

While the present disclosure has been described with reference to various implementations, it will be understood that these implementations are illustrative and that the scope of the disclosure is not limited to them. Many variations, modifications, additions, and improvements are possible. More generally, implementations in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A system for projecting an image onto a surface, the system comprising:
    a presence detector that detects a presence of a person within a distance threshold of a vehicle when one or more security features of the vehicle are active, the one or more security features being activated in response to the presence detector detecting at least one passenger exiting a boundary associated with the vehicle, the presence detector comprising a proximity sensor and a recognition system to determine an identity of the detected person, the identity of the detected person determined using biometric information of the detected person obtained using the recognition system; and
    an image projector configured to project an interactive image onto the surface within a vicinity of the vehicle, the interactive image customized based at least on the identity of the detected person, the interactive image displaying a warning and video being captured when the determined identity of the detected person is unknown.

2. The system of claim 1 further comprising:
    one or more user input sensors to detect an input from the detected person to interact with the interactive image.

3. The system of claim 2 wherein the one or more user input sensors comprises a movement-capturing device to detect a gesture movement of the detected person to interact with the interactive image.

4. The system of claim 2 wherein the one or more user input sensors comprises a microphone to detect a voice command provided by the detected person to interact with the interactive image.

5. The system of claim 2 wherein the one or more user input sensors comprises an accelerometer detector of a mobile device associated with the detected person to detect a gesture of the detected person to interact with the interactive image.

6. The system of claim 1 wherein a mobile device associated with the detected person transmits an indication of the identity of the detected person to the recognition system, the indication generated based on the biometric information.

7. The system of claim 1 further comprising:
    one or more environment sensors to detect an environment condition of an area associated with the vehicle.

8. The system of claim 7 wherein the interactive image projected on the surface within the vicinity of the vehicle comprises at least one of a detected state of the vehicle, the detected environmental condition of the area associated with the vehicle, a news item, or an advertisement.

9. The system of claim 1 further comprising:
    an input/output port for receiving one or more user settings, wherein projection of the interactive image onto the surface is further based at least on the one or more user settings.

10. The system of claim 1 wherein the interactive image projected on the surface within the vicinity of the vehicle comprises at least one direction of travel in connection with egressing from the vehicle, the at least one direction obtained from a known destination.

11. The system of claim 1 wherein the interactive image projected on the surface within the vicinity of the vehicle comprises an illuminated area within the vicinity of the vehicle, wherein one or more security features are activated when the person is detected outside the illuminated area within the vicinity of the vehicle.

12. The system of claim 1 wherein the biometric information includes at least one of facial features, corneal features, gait features, thermal features, or voice features of the detected person.

13. A method for projecting an image from a projection system, the method comprising:
    detecting at least one passenger exiting a boundary associated with a vehicle;
    detecting a presence of a person within a distance threshold of the projection system integrated with the vehicle through one or more proximity sensors;
    determining an identity of the person based on biometric information; and
    projecting an interactive scene onto a surface within a vicinity of the projection system based at least on the identity of the person, the interactive scene customized based on the identity of the person, the interactive scene displaying a warning and video being captured when the identity of the person is unknown.

14. The method of claim 13 further comprising:
    receiving environmental information of an area associated with the projection system from one or more environment sensors.

15. The method of claim 14 wherein the interactive image projected on the surface within the vicinity of the projection system comprises at least one of a detected state of the vehicle, an environmental condition of an area associated with the vehicle, a news item, or an advertisement.

16. The method of claim 13 further comprising:
    receiving information through a connection to an external network and wherein projecting the interactive scene onto the surface is further based on the information received from the external network.

17. The method of claim 13 further comprising:
    receiving one or more user settings through an input/output port and wherein projecting the interactive scene onto the surface is further based on the one or more user settings.

18. The method of claim 13 wherein the interactive scene projected on the surface within the vicinity of the projection system comprises at least one direction in connection with egressing from the vehicle, the at least one direction obtained from a known destination.

19. The method of claim 13 wherein the interactive scene projected on the surface within the vicinity of the projection system comprises an illuminated area within the vicinity of the vehicle, wherein one or more safety features are activated when the person is detected outside the illuminated area within the vicinity of the vehicle.

20. The method of claim 13, further comprising:
    receiving at least one user input at the projection system from the person; and altering the interactive scene based on the at least one user input.

21. The method of claim 20 wherein the at least one user input comprises at least one of a voice command of the person detected by a microphone to interact with the interactive scene or a gesture movement of the person detected by a movement-capturing device to interact with the interactive scene.

22. The method of claim 20 wherein the at least one user input comprises an input from at least one accelerometer of a mobile device associated with the person provided to the projection system to interact with the interactive scene.

23. The method of claim 20 wherein a mobile device transmits the identity of the person to the projection system.

* * * * *